(12) United States Patent
Cao et al.

(10) Patent No.: US 12,288,855 B2
(45) Date of Patent: Apr. 29, 2025

(54) BATTERY MODULE AND BATTERY PACK

(71) Applicant: CONTEMPORARY AMPEREX TECHNOLOGY (HONG KONG) LIMITED, Hong Kong (CN)

(72) Inventors: Gen Cao, Ningde (CN); Sihang Chen, Ningde (CN); Jihua Yao, Ningde (CN); Xiaoteng Huang, Ningde (CN)

(73) Assignee: Contemporary Amperex Technology (Hong Kong) Limited, Hong Kong (CN)

(*) Notice: Subject to any disclaimer, the term of this patent is extended or adjusted under 35 U.S.C. 154(b) by 1053 days.

(21) Appl. No.: 17/130,695

(22) Filed: Dec. 22, 2020

(65) Prior Publication Data

US 2021/0111442 A1 Apr. 15, 2021

Related U.S. Application Data

(63) Continuation of application No. PCT/CN2020/092178, filed on May 25, 2020.

(30) Foreign Application Priority Data

Jun. 28, 2019 (CN) .......................... 201910574459.5

(51) Int. Cl.
*H01M 10/48* (2006.01)
*H01M 10/04* (2006.01)
(Continued)

(52) U.S. Cl.
CPC ..... *H01M 10/486* (2013.01); *H01M 10/0481* (2013.01); *H01M 50/249* (2021.01);
(Continued)

(58) Field of Classification Search
CPC ............. H01M 10/486; H01M 50/271; H01M 50/519; H01M 2220/20; H01M 50/209;
(Continued)

(56) References Cited

U.S. PATENT DOCUMENTS 6,152,597 A * 11/2000 Potega .............. H01M 10/4257
327/512
9,608,298 B2 3/2017 Jeong et al.
(Continued)

FOREIGN PATENT DOCUMENTS

CN 104466067 A 3/2015
CN 106299223 A 1/2017
(Continued)

OTHER PUBLICATIONS

International Search Report issued in International Application No. PCT/CN2020/092178, mailed Aug. 28, 2020, 14 pages.
(Continued)

*Primary Examiner* — Sadie White
*Assistant Examiner* — Kayla Elaine Clary
(74) *Attorney, Agent, or Firm* — STERNE, KESSLER, GOLDSTEIN & FOX P.L.L.C.

(57) ABSTRACT

A battery module as provided includes a battery, a wiring harness board, a circuit board, a compressing piece and a temperature acquisition assembly. The battery includes a top cover. The wiring harness board is arranged on an outer side of the top of the top cover. The circuit board is arranged on a side, away from the battery, of the wiring harness board. The compressing piece is mounted on the wiring harness board. The temperature acquisition assembly includes a thermistor, and the thermistor is electrically connected to the circuit board. The compressing piece compresses the thermistor of the temperature acquisition assembly, so that the thermistor compresses the top cover. The temperature acquisition assembly acquires a temperature of the top cover of the battery, with a short temperature transfer path and rapid temperature transfer response.

9 Claims, 7 Drawing Sheets

(51) Int. Cl.
*H01M 50/249* (2021.01)
*H01M 50/271* (2021.01)
*H01M 50/284* (2021.01)
*H01M 50/298* (2021.01)
*H01M 50/543* (2021.01)

(52) U.S. Cl.
CPC ....... *H01M 50/271* (2021.01); *H01M 50/284* (2021.01); *H01M 50/298* (2021.01); *H01M 50/543* (2021.01); *H01M 2220/20* (2013.01)

(58) Field of Classification Search
CPC ........... H01M 10/4257; H01M 50/505; H01M 50/543
See application file for complete search history.

(56) References Cited

U.S. PATENT DOCUMENTS

| 2012/0064379 | A1 | 3/2012 | Oguri et al. | |
| 2016/0204481 | A1* | 7/2016 | Ryu | H02J 7/007194 429/7 |
| 2018/0138483 | A1* | 5/2018 | Sekine | H01M 10/48 |
| 2018/0342775 | A1* | 11/2018 | Sei | H01M 50/507 |
| 2019/0237817 | A1* | 8/2019 | Hammerschmied | H01M 10/425 |

FOREIGN PATENT DOCUMENTS

| CN | 206349428 U | 7/2017 | |
| CN | 207116634 U | 3/2018 | |
| CN | 207183457 U | 4/2018 | |
| CN | 207558994 U | 6/2018 | |
| CN | 210628444 U | 5/2020 | |
| JP | 2005122956 A | 5/2005 | |
| JP | 2006186045 A | 7/2006 | |
| JP | 2015125813 A | 7/2015 | |
| KR | 20180045794 A | * 5/2018 | ........ H01M 10/0481 |

OTHER PUBLICATIONS

Extended European Search Report issued in International Application No. PCT/CN2020/092178, mailed Aug. 17, 2021, 5 pages.

* cited by examiner

BATTERY MODULE AND BATTERY PACK

CROSS-REFERENCE TO RELATED APPLICATIONS

This application is a continuation of International Application No. PCT/CN2020/092178, filed on May 25, 2020, which is hereby incorporated herein by reference in its entirety. This application claims priority to Chinese Patent Application No. 201910574459.5, filed with the China National Intellectual Property Administration on Jun. 28, 2019 and entitled "BATTERY MODULE", which is hereby incorporated herein by reference in its entirety.

TECHNICAL FIELD

The present application relates to the technical field of batteries, and in particular, to a battery module and a device.

BACKGROUND

The normal working temperature of the battery module is between −30° C. and 55° C. If a temperature exceeds the ultimate temperature, the battery module will limit the discharge power to realize the safety protection of the battery module.

In the related art, the battery module performs temperature acquisition by the following mode: the temperature on the connecting sheet is acquired by the thermistor arranged on the flexible circuit board, and the temperature of the connecting sheet serves as the internal temperature of the battery. In the actual situation, the temperature on the connecting sheet is high and the internal temperature of the battery is low. If the difference between the two is large, the battery module will limit the power in advance, which will affect the performance of the battery module.

At present, the vehicle manufacturers in the industry are developed towards the coupe type direction, and the traditional modified electric vehicles reflect the advantages and characteristics of rapid acceleration of the electric vehicles. Therefore, the demand for rapid acceleration condition will become more and more common, and the requirement on the power of the battery module will become higher and higher.

The inventors found that there are at least the following problems in the prior art: due to the limitation of the internal space size of the battery module and considering the influence of manufacturing and cost, the width and thickness of the connecting sheet are not large. Under lower working conditions, such as 1C discharge, the temperature of the connecting sheet is close to the internal temperature of the battery. However, if higher discharge rate is adopted, the temperature of the connecting sheet is much higher than the internal temperature of the battery. Under the working condition of high power, due to the limitation of the overcurrent area of the connecting sheet, the temperature of the connecting sheet rises sharply, the internal temperature of the battery rises slowly, and the temperature difference between the two is huge, resulting that the power module limits the power in advance, thus affect the discharge power of the battery module. Therefore, how to detect the internal temperature of the battery is an urgent technical problem to be solved in the industry.

SUMMARY

The present application provides a battery module and a device, for optimizing a structure of the battery module.

The embodiment of the present application provides a battery module, comprising:
a battery, comprising a top cover; a wiring harness board, arranged on an outer side of the top of the top cover; a circuit board, arranged on a side, away from the battery, of the wiring harness board; a compressing piece, mounted on the wiring harness board; and a temperature acquisition assembly, comprising a thermistor, wherein the thermistor is electrically connected to the circuit board, and the compressing piece compresses the thermistor, so that the thermistor compresses the top cover.

In some embodiments, the temperature acquisition assembly further comprises: a heat-conducting pad, arranged between the thermistor and the top cover.

In some embodiments, the thermistor is electrically connected to the circuit board through a lead, and the heat-conducting pad is compressed to the top cover by the compressing piece.

In some embodiments, the thermistor is fixed to the circuit board to realize electric connection between the thermistor and the circuit board; and the compressing piece compresses the circuit board, and the circuit board compresses the heat-conducting pad to the top cover.

In some embodiments, the compressing piece is provided with a mounting groove, and the thermistor is arranged in the mounting groove.

In some embodiments, a depth of the mounting groove is greater than a thickness of the thermistor, and the thermistor is positioned in the mounting groove.

In some embodiments, the mounting groove penetrates through the compressing piece along a thickness direction of the compressing piece.

In some embodiments, the thermistor adheres to an inner wall of the mounting groove through a binder.

In some embodiments, the wiring harness board is provided with a hole, and the heat-conducting pad is mounted in the hole.

In some embodiments, an elastic structure is arranged on a side, facing towards the top cover, of the wiring harness board, and the elastic structure abuts against the top cover.

In some embodiments, the elastic structure comprises:
an elastic sheet; one end of the elastic sheet is fixedly connected to the wiring harness board and the other end of the elastic sheet is protruded towards the top cover; or
the two ends of the elastic sheet are fixedly connected to the wiring harness board, and a middle part of the elastic sheet is protruded towards the top cover; or the middle part of the elastic sheet is fixedly connected to the wiring harness board, and the two ends of the elastic sheet are protruded towards the top cover.

In some embodiments, the wiring hardness board comprises an abutting portion and the abutting portion is provided with a protrusion; the battery comprises an electrode terminal arranged on the top cover; and
the battery module further comprises connecting sheet, the connecting sheet is fixedly connected to the electrode terminal, and the connecting sheet abuts against the protrusion.

In some embodiments, a positioning structure is arranged between the compressing piece and the wiring harness board, and the positioning structure is configured to position the compressing piece.

In some embodiments, the positioning structure comprises: a positioning column, arranged on the wiring harness board; and a positioning hole, formed on the compressing piece, the positioning column passing through the positioning hole and being fixed to the positioning hole.

The embodiment of the present application further provides a device, comprising the battery module in the above embodiment. The battery module is configured to provide electric energy.

According to the battery module and the device provided by the above embodiment, the thermistor of the temperature acquisition assembly is compressed to the top cover of the battery by the compressing piece mounted on the wiring harness board, and a temperature acquired by the thermistor is the temperature of the top cover. The temperature of the top cover is consistent with the internal temperature of the battery, and the top cover will reflect the change and size of the internal temperature of the battery in time. If the internal temperature of the battery rises, the temperature of the top cover increases timely; and if the internal temperature of the battery decreases, the temperature of the top cover decreases timely. The temperature of the top cover changes timely along with the change of the internal temperature of the battery.

According to the battery module provided by the above solution, the thermistor of the temperature acquisition assembly compresses the top cover of the battery, and heat transfer is conducted through the top cover, thereby realizing temperature acquisition. The temperature acquisition assembly transfers the acquired temperature to the circuit board and other components, thereby facilitating subsequent analysis and processing judgment. It will be seen from the above temperature transfer path that according to the battery module provided by the above technical solution, when the internal temperature of the battery is acquired, the top cover of the battery serves as a starting point of temperature acquisition, the overall temperature acquisition and transfer path is short and the temperature response is rapid. When subsequent processing is conducted on the basis of the acquired temperature, control is more accurate, thereby effectively reducing, even avoiding the condition that the battery module limits the power in advance, effectively exerting the performance of the battery module, effectively optimizing the structure and performance of the battery module, optimizing the performance of vehicle equipment using the battery module, and improving the reliability of the vehicle equipment.

DETAILED DESCRIPTION

The technical solution provided by the embodiment of the present application is described in detail with reference to FIG. 1 to FIG. 14.

Referring to FIG. 1 to FIG. 14, the embodiment of the present application provides a battery module, comprising a battery 1, a wiring harness board 2, a circuit board 3, a compressing piece 4 and a temperature acquisition assembly 5. The battery 1 comprises a top cover 11. The wiring harness board 2 is arranged on an outer side of the top of the top cover 11. The circuit board 3 is arranged on a side, away from the battery 1, of the wiring harness board 2. The compressing piece 4 is mounted on the wiring harness board 2. The temperature acquisition assembly 5 comprises a thermistor 51, and the thermistor 51 is electrically connected to the circuit board 3. The compressing piece 4 compresses the thermistor 51 of the temperature acquisition assembly 5, so that the thermistor 51 compresses the top cover 11.

Optional structures of various parts and a connection relationship between each other are described hereinafter in detail.

Figure 1:
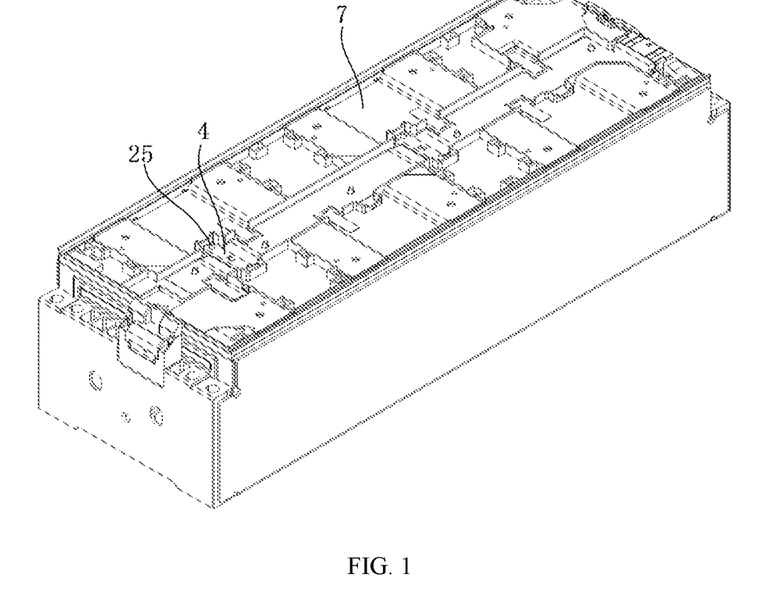
FIG. 1 is a schematic stereostructure diagram of a battery module according to some embodiments of the present application.
Figure 2:
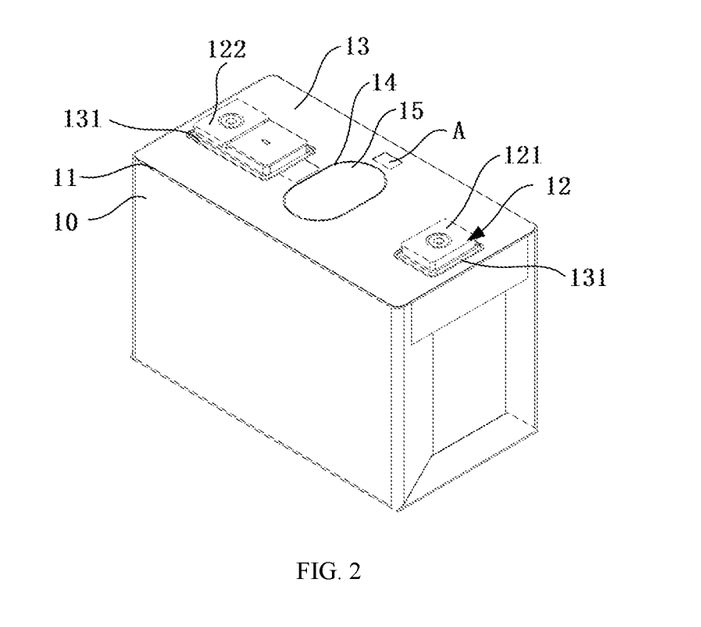
FIG. 2 is a schematic diagram of a battery stereostructure of a battery module according to some embodiments of the present application.

Referring to FIG. 2, the optional structure of the battery 1 is as follows: the battery 1 comprises a shell 10, an electrode assembly arranged in the shell 10 (not shown in the figure), a top cover 11 arranged at the top of the electrode assembly, an electrode terminal 12 arranged on the top cover 11, and a top patch 13 arranged at the top of the top cover 11. Specifically, the top patch 13 adheres to the top of the top cover 11. The top patch 13 is provided with an anti-explosion hole 14, and an anti-explosion valve 15 is mounted in the anti-explosion hole 14. The top patch 13 is further provided with two electrode terminal holes 131, and one electrode terminal 12 is mounted in each of the two electrode terminal holes 131. The electrode terminal 12 comprises a positive electrode terminal 121 and a negative electrode terminal 122, that is, the positive electrode terminal 121 is mounted in one of the electrode terminal holes 131 and the negative electrode terminal 122 is mounted in the other one of the electrode terminal holes 131.

A material of the top patch 13 is, for example, an insulation material. The top patch 13 is sheet-shaped, and a size of the top patch 13 is matched with a size of a top surface of the top cover 11. For example, a structure and the size of the top patch 13 just completely cover the top surface of the top cover 11; or the size of the top patch 13 is slightly greater than the size of the top surface of the top cover 11, so that the top patch 13 has a sufficient size to form a bending edge to cover the top cover 11.

On one hand, the top patch 13 achieves an insulating effect to prevent the shortcircuit phenomenon of the top cover 11 and an external circuit. On the other hand, the top patch 13 also achieves an effect of protecting the top cover 11 to prevent the top cover 11 from being scratched.

According to different manufacturing modes of the electrode assembly, there are two kinds: a laminated battery and a winding battery. The laminated battery is formed by cutting a positive electrode plate, a negative electrode plate and a diaphragm into a specified size and then superimposing the positive electrode plate, the negative electrode plate and the diaphragm. The winding battery is formed by winding a positive electrode plate, a negative electrode plate and a diaphragm.

Referring to FIG. 2, to acquire a surface temperature of the top cover 11, the top patch 13 is provided with an opening A, so as to take a partial region exposed from the top cover 11 as a temperature sampling part.

Referring to FIG. 2, the opening A is, for example, formed at any position of the top patch 13, but the temperature of the whole surface of the top cover 11 is not completely consistent. Considering the mounting convenience and the temperature acquisition accuracy of the temperature acquisition assembly 5, the opening A is, for example, formed proximal to the negative electrode terminal 122. A temperature of a position, proximal to the negative electrode terminal 122, of the top cover 11 of the battery 1 is close to a real time inside the battery 1, and a temperature difference between the two under the severe working condition is within acceptable 5° C. The temperature acquisition assembly 5 is mounted at the opening A, so that the temperature acquired by the temperature acquisition assembly 5 is less different from the internal temperature of the battery 1, and the temperature acquired by the temperature acquisition assembly 5 accurately reflects the internal temperature of the battery 1. Therefore, during subsequent analysis and processing on temperature data acquired by the temperature acquisition assembling 5 based on the circuit board 3, the acquired data is more accurate, control is more accurate, and the phenomenon that the battery module limits the discharge power in advance is effectively reduced.

Referring to FIG. 3 to FIG. 6, in some embodiments, the circuit board 3, for example, adopts a flexible printed circuit board (FPC), or adopts a printed circuit board (PCB). The PCB has high rigidity and high hardness; and the FPC has high flexibility and low hardness.

Referring to FIG. 3 to FIG. 7, the circuit board 3 is, for example, long strip-shaped, and the circuit board 3 is positioned in a middle area of the wiring harness board 2.

In some embodiments, the compressing piece 4 has many implementation manners, for example, adopting a tabulate plate structure and a fastener, and the fastener is, for example, a binder, rivet, a bolt and the like. Or the compressing piece 4 adopts a structure with an inner concave portion, and the inner concave portion is configured to mount and position the thermistor 51. The inner concave portion is, for example, a groove, a hole or other structures. The specific implementation manner of the compressing piece 4 is described hereinafter in detail with reference to other combinations.

In some embodiments, the temperature acquisition assembly 5 comprises a thermistor 51. The thermistor 51 is a patch type negative temperature coefficient (NTC) temperature sensor or a drop head type NTC temperature sensor.

Figure 12:
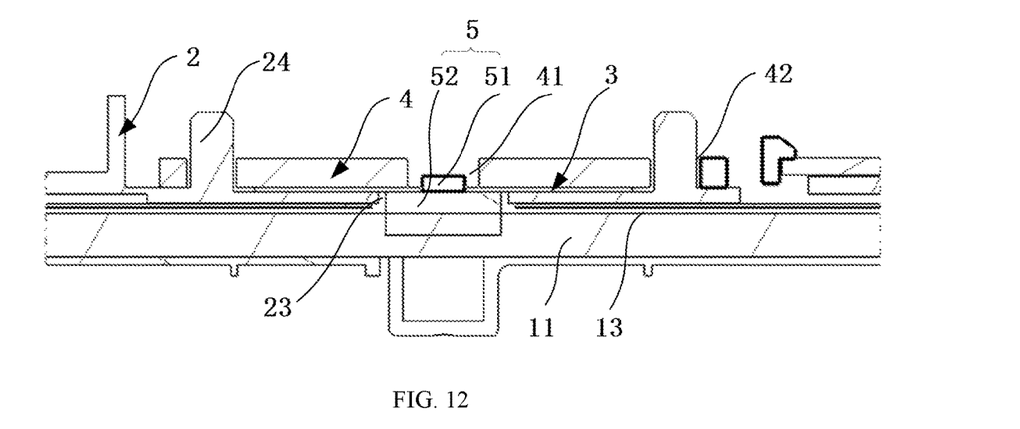
FIG. 12 is a schematic diagram of a sectional structure at a temperature acquisition assembly under a mounting state.

Referring to FIG. 12, in some embodiments, the temperature acquisition assembly 5 further comprises a heat-conducting pad 52. The heat-conducting pad 52 is arranged between the thermistor 51 and the top cover 11.

In some embodiments, the heat-conducting pad 52 has high heat conductivity coefficient and high compressibility. The heat-conducting pad 52 with the above structure not only improves heat transfer efficiency, but also bears expansive deformation of the battery 1 of the battery module in the charging and discharging process and extrusion during impact vibration.

The structure and mounting position relationship of the thermistor 51 and the heat-conducting pad 52 of the temperature acquisition assembly 5 will be described hereinafter in detail.

Specifically, in some embodiments, the thermistor 51 selects a drop head type NTC temperature sensor. The drop head type NTC temperature sensor comprises a head portion and a lead connected to the head portion. Since the head is drop-shaped, the head is also referred to as a drop head or an end portion. The head portion of the drop head type NTC temperature sensor may direct abut against the heat-conducting pad 52, or a film structure which hardly affects temperature transfer is clamped between the two. The heat-conducting pad 52 is compressed to the top cover 11 of the battery 1 by the compressing piece 4. The compressing piece 4, for example, directly compresses the heat-conducting pad 52; or the compressing piece 4 compresses the heat-conducting pad 52 by compressing other parts. By adoption of the above structure, the thermistor 51 accurately acquires the temperature of the top cover 11 of the battery 1.

Figure 4:
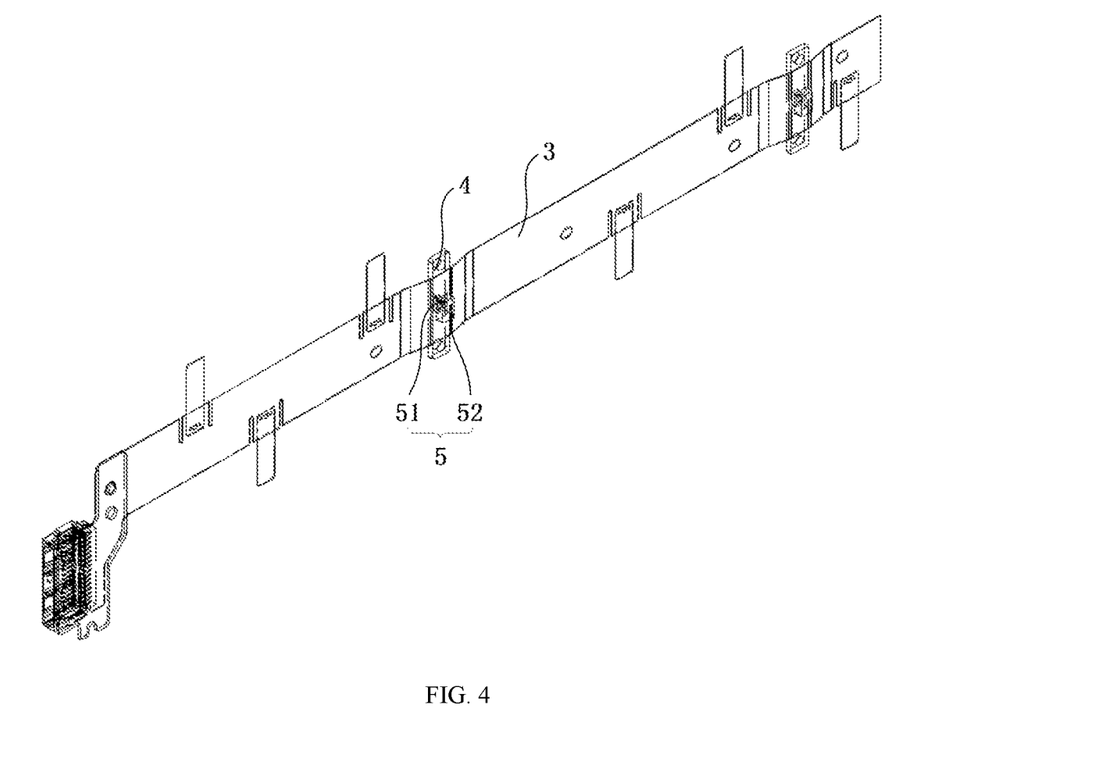
FIG. 4 is a schematic stereostructure diagram during mounting of a temperature acquisition assembly of a battery module according to some embodiments of the present application.
Figure 5:
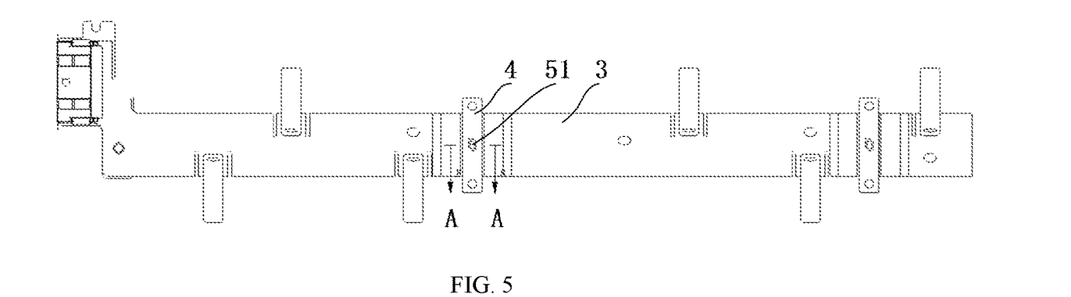
FIG. 5 is a schematic structural front view during mounting of a temperature acquisition assembly of a battery module according to some embodiments of the present application.
Figure 6:
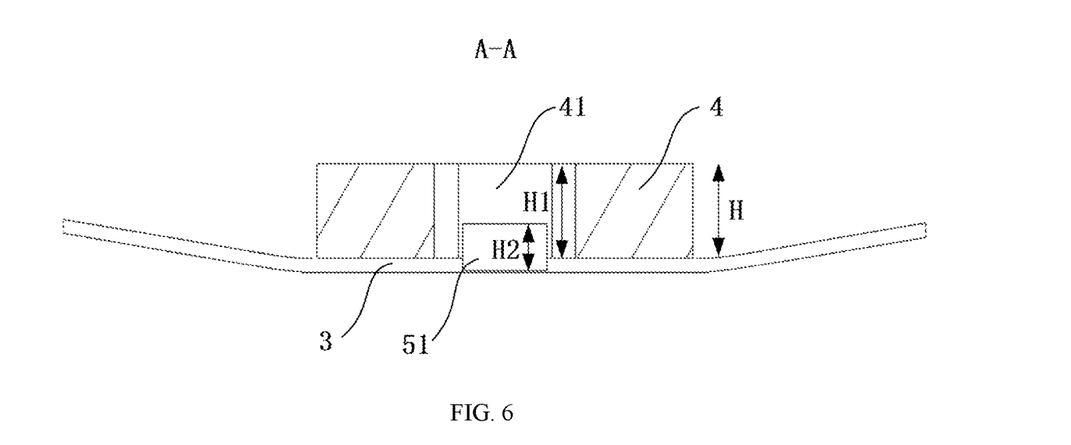
FIG. 6 is an A-A local sectional schematic diagram of a mounting position of a temperature acquisition assembly of a battery module according to some embodiments of the present application.

In some other embodiments, the thermistor 51 selects a patch type NTC temperature sensor, the patch type NTC temperature sensor comprises a head portion and a lead connected to the head portion, and the head portion is roughly of a cuboid structure, referring to FIG. 4, FIG. 5 and FIG. 6. The head portion of the patch type NTC temperature sensor is in contact with the heat-conducting pad 52 directly or through the film structure which hardly affects temperature transfer. The heat-conducting pad 52 is compressed to the top cover 11 by the compressing piece 4. The compressing piece 4, for example, directly compresses the heat-conducting pad 52; or the compressing piece 4 compresses the heat-conducting pad 52 by compressing other parts. By adoption of the above structure, the thermistor 51 accurately acquires the temperature of the top cover 11.

After the heat-conducting pad 52 is arranged, the temperature transfer path is: the temperature of the top cover 11 is transferred to the heat-conducting pad 52, and the temperature of the heat-conducting pad 52 is transferred to the thermistor 51. The thermistor 51 transmits the acquired temperature signal to the circuit board 3 and performs analysis and processing to control the discharge power of the battery module.

It will be seen from the above analysis that in the above technical solution, the thermistor 51 acquires the temperature of the top cover 11 of the battery 1. The temperature of the top cover 11 is consistent with the internal temperature of the battery 1, and the top cover 11 reflects the change and size of the internal temperature of the battery 1 in time. Furthermore, the above temperature transfer path is short, and the thermistor 51 is high in response speed of temperature acquisition, so that when subsequent processing is conducted on the basis of the collected temperature, control is more accurate, thereby effectively reducing, even avoiding the condition that the battery module limits the power in advance, effectively exerting the performance of the battery module, effectively optimizing the structure and performance of the battery module, optimizing the performance of vehicle equipment using the battery module, and improving the reliability of the vehicle equipment.

Several connection modes of the thermistor 51 are described hereinafter.

The first connection mode of the thermistor 51 is: in some embodiments, the thermistor 51 is electrically connected to the circuit board 3 through a lead (not shown in the figure). The heat-conducting pad 52 is compressed to the top cover 11 by the compressing piece 4, so that the heat-conducting pad 52 maintains attached to the top cover 11. The thermistor 51 is in contact with a side, away from the top cover 11, of the heat-conducting pad 52, referring to FIG. 9 to FIG. 12.

A length of the lead is relevant to a setting position of the thermistor 51 and an electric connection position of the lead and the circuit board 3. Specifically, the lead and the circuit board 3, for example, are electrically connected by the following mode: an end part, away from the thermistor 51, of the lead is electrically connected to a plug, and the circuit board 3 is fixedly provided with a socket. The plug and the socket are in inserting connection to realize electric connection between the lead and the circuit board 3.

By adoption of the above structure, a relative cooperation relationship of various parts is as follows: the heat-conducting pad 52 is placed on the top surface of the top cover 11, and the compressing piece 4 fixedly connected to the wiring harness board 2 presses the heat-conducting pad 52. The compressing piece 4 has a structure of limiting the thermistor 51, such as a mounting groove 41 described hereinafter, referring to FIG. 12. After the thermistor 51 is mounted in the mounting groove 41 in place, the thermistor 51 is fixed to a side wall of the mounting groove 41 through binder dispensing.

In the above structure, the thermistor 51 and the heat-conducting pad 52, for example, are in direct contact; or a film of the circuit board 3 is spaced between the thermistor 51 and the heat-conducting pad 52. Since a thickness of the film is very small, the temperature transfer process is hardly affected.

According to the above technical solution, the temperature acquisition route of the battery module is as follows: the temperature of the top cover 11 is transferred to the heat-conducting pad 52, is transferred to the thermistor 51 and then is transferred to the circuit board 3 through a lead connected to the thermistor 51, thereby analyzing and processing the temperature data. Since the temperature acquisition path is short, the thermistor 51 is rapid in temperature acquisition, the temperature is transferred accurately, and the temperature acquired by the thermistor 51 changes timely along with the change of the internal temperature of the battery 1.

Figure 3:
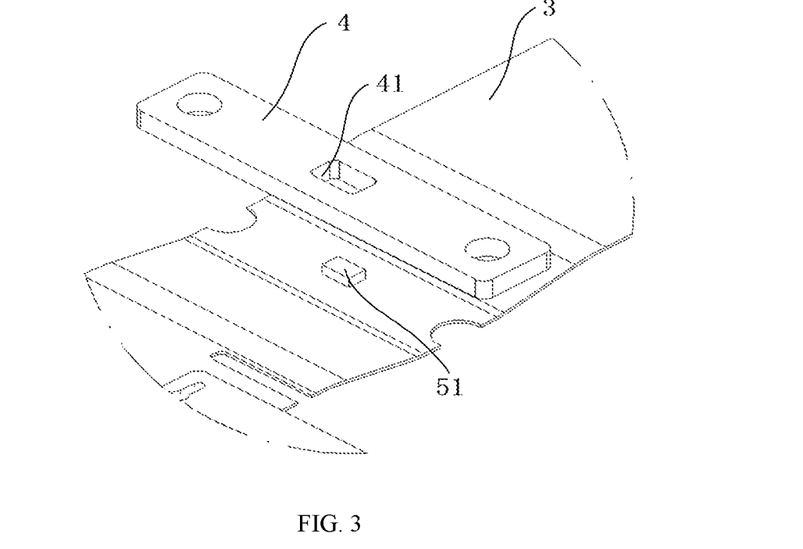
FIG. 3 is a local three-dimensional schematic diagram of a mounting position of a compressing piece of a battery module according to some embodiments of the present application.

Referring to FIG. 3 and FIG. 6, the compressing piece 4 is provided with a mounting groove 41, and the thermistor 51 is arranged in the mounting groove 41.

The mounting groove 41, for example, is through, or the mounting groove 41 is a sunk groove. A shape of the mounting groove 41 and an end portion of the thermistor 51 are, for example, the same or different, but a size of the mounting groove 41 needs to meet the mounting requirement of the end portion of the thermistor 51, so that the end portion of the thermistor 51 is completely positioned in the mounting groove 41. The shape of the mounting groove 41 is, for example, round, square or other irregular shapes.

The thermistor 51 is positioned in the mounting groove 41 of the compressing piece 4. After the heat-conducting pad 52 is compressed, a counter-acting force acts on the compressing piece 4, so that the thermistor 51 is not stressed, thereby effectively avoiding functional failure caused by a stress of the thermistor 51.

For example, a limiting protection structure is arranged in the mounting groove 41, so that the position is relatively fixed after the thermistor 51 is mounted in the mounting groove 41; furthermore, in the use process of the battery module, the thermistor 51 does not loosen and shift, so that the temperature acquisition operation of the thermistor 51 is performed accurately.

Or the thermistor 51 is positioned in the mounting groove 41 by other modes. The thermistor 51, the heat-conducting pad 52 and the like are mounted in place, and binder is dispensed in the mounting groove 41, so that the thermistor 51 is fixed to an inner wall of the mounting groove 41. Adhesion may enhance the reliability of fixed connection between the thermistor 51 and the inner wall of the mounting groove 41, and realize the waterproof property of the thermistor 51 to prevent the thermistor 51 from being damaged by water drops. In addition, the thermistor 51 is positioned in the mounting groove 41 and the inner wall of the mounting groove 41 limits a flow region of a binder, thus preventing the binder overflowing phenomenon. The binder may adopt a heat-conducting binder.

Referring to FIG. 3 and FIG. 6, in some embodiments, the mounting groove 41 penetrates through the compressing piece 4 along a thickness direction H of the compressing piece 4, that is, the mounting groove 41 is through. The through structure may further prevent the thermistor 51 from being damaged by a pressure applied by the compressing piece 4, thus ensuring that the thermistor 51 works normally.

Referring to FIG. 3 and FIG. 6, a depth H1 of the mounting groove 41 is greater than a thickness H2 of the thermistor 51. The mounting groove 41 of the compressing piece 4 surrounds the thermistor 51, and the thermistor 51 is completely positioned in the mounting groove 41 to ensure that a counter-acting force acts on the compressing piece 4 after the heat-conducting pad 52 is compressed, the thermistor 51 is not stressed, thus preventing functional failure caused by a stress of the thermistor 51. On the other hand, due to the compressing piece 4, a peripheral region of the thermistor 51 is flat and not bent, a mounting surface of the thermistor 51 is flat, and the contact area is large during mounting, thus ensuring reliable mounting of the thermistor 51.

According to the above technical solution, the mounting groove 41 achieves an effect of avoiding and protecting the thermistor 51, thereby avoiding damage to the thermistor 51 caused by a pressure applied by the compressing piece 4 and ensuring the temperature acquisition function of the thermistor 51.

The second setting mode of the thermistor 51 is: the thermistor 51 is fixed to the circuit board 3 to realize electric connection between the thermistor 51 and the circuit board 3. The compressing piece 4 compresses the circuit board 3, and the circuit board 3 compresses the heat-conducting pad 52 to the top cover 11.

The difference between the second setting mode and the first setting mode of the thermistor 51 is: in the second setting mode, the thermistor 51 is directly fixed to the circuit board 3, and a length of a lead for electric connection between the thermistor 51 and the circuit board 3 may be almost negligible. The thermistor 51 and the circuit board 3 equivalently form a whole. Specifically, the thermistor 51 is directly welded to a bonding pad of the circuit board 3 and is electrically connected to a temperature sampling circuit in the circuit board 3.

As described above, the wiring harness board 2 is arranged on the outer side of the top of the top cover 11, and the circuit board 3 is arranged on one side, away from the top cover 11, of the wiring harness board 2. If the thermistor 51 and the heat-conducting pad 52 are arranged on the same side of the circuit board 3, the thermistor 51 is in direct contact with the heat-conducting pad 52. If the thermistor 51 and the heat-conducting pad 52 are arranged on the different sides of the circuit board 3, an insulating film of the circuit board 3 is clamped between the thermistor 51 and the heat-conducting pad 52. The insulating film is very thin, which hardly affects heat transfer of the top cover 11.

To enable the thermistor 51 to acquire the temperature of the top cover 11, the wiring harness board 2 is provided with a hole for avoiding (that is, a hole 23 described hereinafter, referring to FIG. 12), so that the heat-conducting pad 52 is in direct contact with the top cover 11. The compressing piece 4 compresses the heat-conducting pad 52 by comprising the circuit board 3, so that the heat-conducting pad 52 compresses the top cover 11, the heat-conducting pad 52 maintains attached to the top cover 11, and the thermistor 51 accurately realizes temperature acquisition subsequently.

By adoption of the above technical solution, the temperature acquisition route of the battery module is as follows: the temperature of the top cover 11 is transferred to the heat-conducting pad 52, is transferred to the thermistor 51 and then is directly transferred to the circuit board 3, thereby analyzing and processing the temperature data. The above temperature acquisition route is shorter, temperature acquisition of the thermistor 51 is faster, and the temperature is transferred more accurately.

It has been described above that the wiring harness board 2 may be provided with a hole for avoiding, thereby realizing mounting and normal work of each part of temperature acquisition. The specific avoiding structure of the wiring harness board 2 is described hereinafter.

Referring to FIG. 12, in some embodiments, the wiring harness board 2 is provided with a hole 23, and the heat-conducting pad 52 passes through the hole 23. A side surface of one side of the heat-conducting pad 52 adheres to the compressing piece 4 or the circuit board 3, and a side surface of the other side of the heat-conducting pad 52 adheres to the top cover 11.

Referring to FIG. 12, the wiring harness board 2 is provided with a square hole serving as the hole 23, and the heat-conducting pad 52 adheres to a surface, proximal to the top cover 11, of the compressing piece 4 or the circuit board 3 after the compressing piece 4 is fixedly connected to the wiring harness board 2. A side wall of the square hole of the wiring harness board 2 serves as a predetermined position when the heat-conducting pad 52 is stuck, and the above structure prevents displacement of the heat-conducting pad 52 under the severe working condition.

Figure 10:
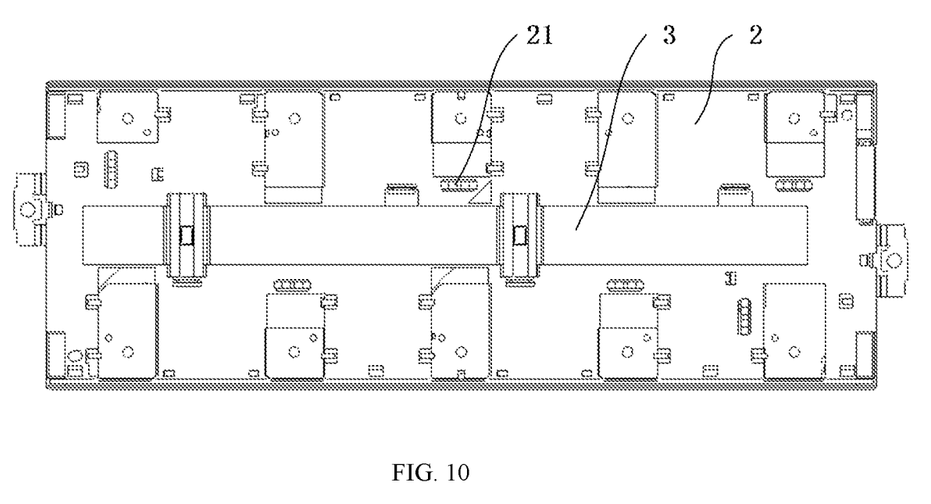
FIG. 10 is a schematic structural front view of a side, provided with an elastic structure, of a wiring harness board of a battery module according to some embodiments of the present application.
Figure 13:
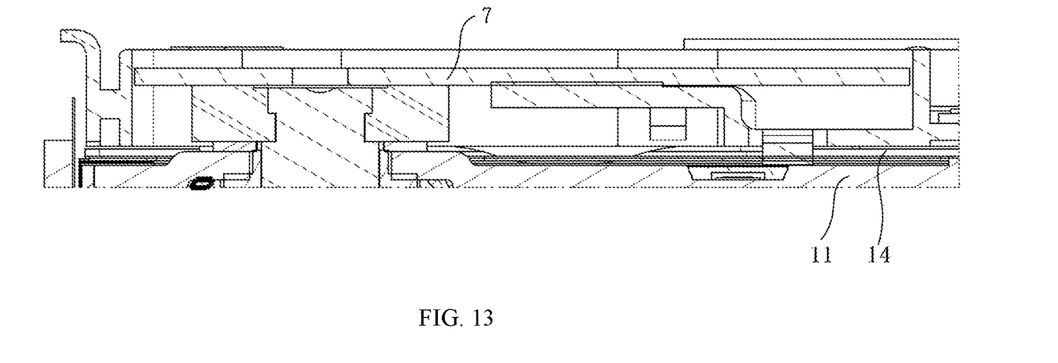
FIG. 13 is a schematic diagram of a local sectional structure of a battery module according to some embodiments of the present application.
Figure 14:
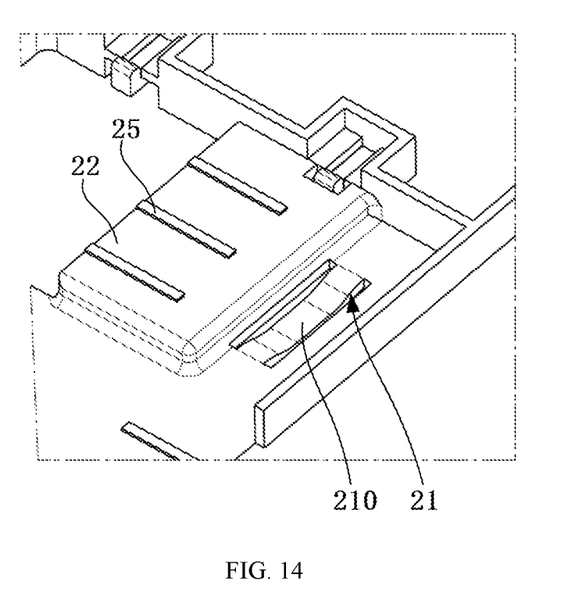
FIG. 14 is a schematic diagram of a local stereostructure of a battery module according to some embodiments of the present application.

Referring to FIG. 10, FIG. 13 and FIG. 14, to make the wiring harness board 2 in tight contact with the top cover 11 of the battery 1 and avoid the loosening phenomenon of the wiring harness board 2 and the top cover 11 of the battery 1, in some embodiments, an elastic structure 21 is arranged on a side, facing towards the top cover 11, of the wiring harness board 2, and the elastic structure 21 abuts against the top cover 11 of the battery 1.

The elastic structure 21 is provided, so that the temperature acquisition assembly 5 is mounted more stably, the stability and the long-term reliability of the temperature acquisition assembly 5 are improved, and the compressing reliability of the temperature acquisition assembly 5 and the top cover 11 may be enhanced under various impact or vibration working conditions.

Referring to FIG. 12 to FIG. 14, specifically, the elastic structure 21 comprises an elastic sheet 210, and one end of the elastic sheet 210 is fixedly connected to the wiring harness board 2, specifically for example, inserting connection, clamping connection, fastener connection or integrated formation and the like. The other end of the elastic sheet 210 is protruded towards the outer side of the wiring harness board 2. By adoption of the structure, the elastic sheet 210 roughly has, for example, a structure of which the other end is bent and warped. After the elastic sheet 210 is mounted in place, the wiring harness board 2 and the top cover 11 of the battery 1 are compressed through a force generated by deformation of a warping end.

The elastic sheet 210, for example, further adopts the following structure: the two ends of the elastic sheet 210 are fixedly connected to the wiring harness board 2, and a middle part of the elastic sheet 210 is protruded towards the top cover 11. After the elastic sheet 210 is mounted in place, the middle part of the elastic sheet 210 is deformed, and the wiring harness board 2 and the top cover 11 of the battery 1 are compressed through a force generated by deformation of the middle part of the elastic sheet 210.

The elastic sheet 210, for example, further may adopt the following structure: the middle part of the elastic sheet 210 is fixedly connected to the wiring harness board 2, and the two ends of the elastic sheet 210 are protruded towards the top cover 11.

The elastic sheet 210 is arc-shaped or has other bending shapes. After the elastic sheet 210 is mounted in place, the two ends of the elastic sheet 210 are deformed, and the wiring harness board 2 and the top cover 11 of the battery 1 are compressed through a force generated by deformation of the two ends of the elastic sheet 210.

According to the above technical solutions, the elastic structure 21 is in tight fit with the top cover 11, thereby ensuring that the wiring harness board 2 adheres to the top cover 11 of the battery 1 after a connecting sheet 7 described hereinafter is welded.

Referring to FIG. 12 to FIG. 14, in some embodiments, the wiring hardness board 2 comprises an abutting portion 22, and the abutting portion 22 is provided with a protrusion 25. The battery 1 comprises an electrode terminal 12 arranged on the top cover 11. The battery module further comprises a connecting sheet 7. The connecting sheet 7 is fixedly connected to the electrode terminal (12). The connecting sheet 7 abuts against the protrusion 25.

Since the connecting sheet 7 and the electrode terminal 12 of the battery 1 are welded and fixed, a mounting space between the connecting sheet 7 and the electrode terminal 12 of the battery 1 is relatively certain, the protrusion 25 which the abutting portion 22 of the wiring harness board 2 is provided with enables the wiring harness board 2 to be in tighter contact with the connecting sheet 7, the structure of the whole battery module is more stable and reliable, and the impact and vibration resistance of the battery module is enhanced.

Referring to FIG. 14, in some embodiments, the protrusions 25 are strip-shaped and are arranged on the abutting portion 22 in a row. Shapes and sizes of the protrusions 25 are, for example, completely the same or different.

According to the above technical solution, each protrusion 25 of the abutting portion 22 is in interference fit with the connecting sheet 7, thus ensuring that the wiring harness board 2 adheres to the top cover 11 of the battery 1 after the connecting sheet 7 is welded to the electrode terminal 12.

The compressing piece 4 described above is mounted on the wiring harness board 2, and a specific connection structure between the compressing piece 4 and the wiring harness board 2 is described hereinafter in detail.

Figure 11:
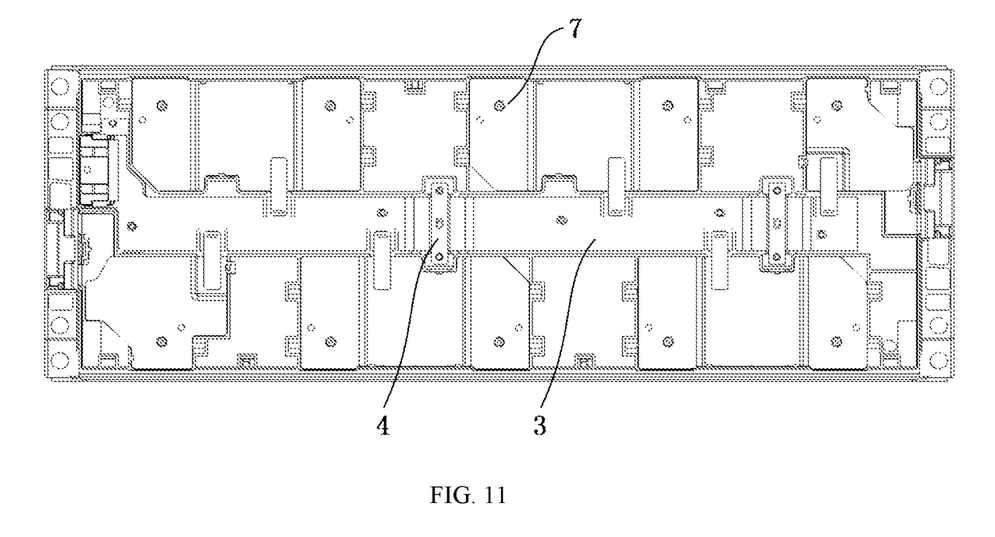
FIG. 11 is a schematic structural front view after a connecting sheet is mounted on a wiring harness board.

Referring to FIG. 11 and FIG. 12, in some embodiments, a positioning structure is arranged between the compressing piece 4 and the wiring harness board 2, and the positioning structure 9 is configured to position the compressing piece 4.

The positioning structure 9 has many implementation manners, such as buckling fit, column and hole fit described hereinafter and the like, which are described hereinafter in detail.

The positioning structure is provided, so that the compressing piece 4 and the wiring harness board 2 are mounted and positioned more accurately, the mounting position of the thermistor 51 is more accurate, the accuracy of the temperature acquisition position of the battery module is ensured, and the acquired temperature of the top cover 11 is accurate.

Figure 7:
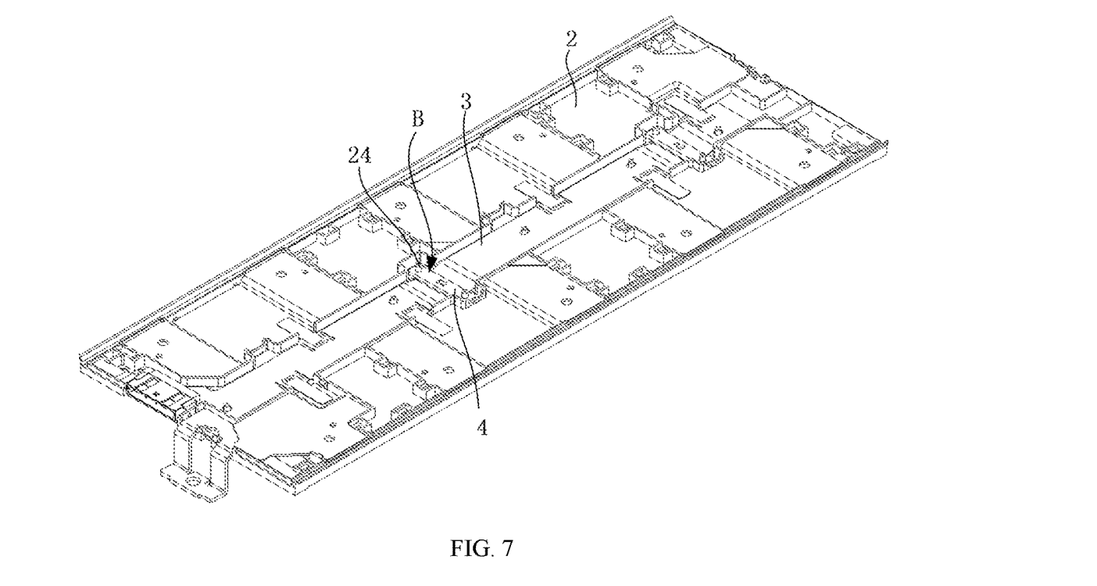
FIG. 7 is a three-dimensional schematic diagram of a connection relationship of a wiring harness board, a circuit board and a compressing piece of a battery module according to some embodiments of the present application.
Figure 8:
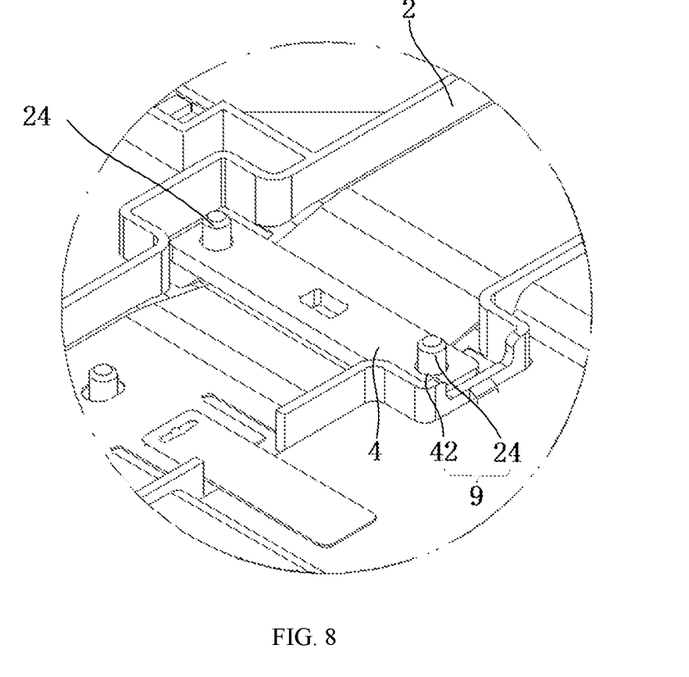
FIG. 8 is an enlarged schematic diagram of a local part B of FIG. 7.
Figure 9:
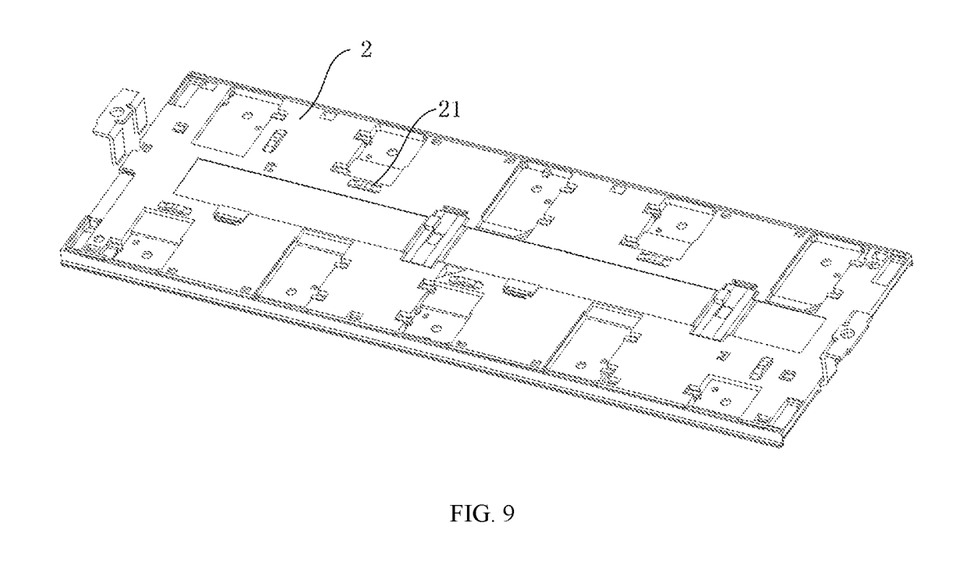
FIG. 9 is a schematic stereostructure diagram of a side, provided with an elastic structure, of a wiring harness board of a battery module according to some embodiments of the present application.

Referring to FIG. 7 and FIG. 8, specifically, the positioning structure comprises a positioning column 24 arranged on the wiring harness board 2 and a positioning hole 42 formed in the compressing piece 4. The positioning column 24 passes through the positioning hole 42 and is fixed to the positioning hole 42. The positioning column 24, for example, is fixed in the positioning hole 42 by hot riveting.

In addition, the positioning structure may also adopt a buckling fit structure, for example, a clamping hook is arranged on the wiring harness board 2 and the clamping hook is in clamping fit with the compressing piece 4, so that the compressing piece 4 and the wiring harness board 2 are fixed reliably.

Or on the basis that the clamping hook is arranged on the wiring harness board 2, a clamping hole may be formed in the compressing piece 4, and the clamping hook and the clamping hole are in clamping fit to reliably fix the compressing piece 4 and the wiring harness board 2. Of course, the positioning structure may also adopt a toothed fit structure and the like.

The positioning structure adopts the above implementation manner, so that the wiring harness board 2 is more accurate in mounting position and faster and more accurate in mounting operation.

According to the above technical solution, the temperature acquisition assembly 5 is assembled on a semi-finished product of the batter module, the connecting sheet 7 is welded to the electrode terminal 12 of the battery 1, and a height difference between the connecting sheet 7 and the top cover 11 is limited. The wiring harness board 2 is provided with a certain number of protrusions 25 below the connecting sheet 7; meanwhile, an elastic structure 21 protruded downwards is arranged at the bottom of the wiring harness board 2. A distance between the elastic structure 21 and the protrusion 25 is greater than a distance between the connecting sheet 7 and the top cover 11 after welding, thus ensuring that the connecting sheet 7 compresses the wiring harness board 2 to the top cover 11 of the battery 1 after the connecting sheet 7 is welded to the electrode terminal 12.

After the connecting sheet 7 compresses the wiring harness board 2 to the top cover 11, a gap value between the compressing piece 4 and the top cover 11 has been limited. A heat-conducting pad 52 with a thickness greater than a gap between the compressing piece 4 and the top cover 11 is selected in advance. When the wiring harness board 2 adheres to the top cover 11, the compressing piece 4 is fixed to the wiring harness board 2 by hot riveting and compresses the heat-conducting pad 52, the heat-conducting pad 52 and the top cover 11 of the battery 1 form interference fit, and the heat-conducting pad 52 maintains tight fit with the top cover 11, thus realizing the following temperature acquisition route: top cover 11→heat-conducting pad 52→thermistor 51→circuit board 3. The temperature acquisition route is short, and temperature acquisition is accurate and rapid in response.

The embodiment of the present application further provides a device, comprising the battery module described above. The battery module is configured to provide electric energy. The device may be a vehicle or energy-storing equipment.

In the description of the present application, it should be understood that an azimuth or position relationship indicated by terms "center", "longitudinal", "transverse", "front", "rear", "left", "right", "vertical", "horizontal", "top", "bottom", "inner", "outer" and the like is an azimuth or position relationship based on the accompanying draws, which is only for facilitating description of the present application and simplifying description, but not indicates or implies that the referred device or component must have a specific azimuth and perform construction and operation in the specific azimuth; therefore, it will not be interpreted as a limitation to the protection scope of the present application.

Finally, it should be noted that the above embodiments are only intended to describe the technical solution of the present application, but not to limit the technical solution. Although the present application is described in detail with reference to the above embodiments, those skilled in the art should understand that: the technical solution recorded in each of the above embodiments may still be modified, or part of the technical features may be equivalently replaced, but these modifications or replacements do not make the essence of the corresponding technical solution depart from the spirit and scope of the technical solution of each embodiment.

The invention claimed is:

1. A battery module, comprising:
   a battery, comprising a top cover;
   a wiring harness board, arranged on an outer side of the top of the top cover;
   a circuit board, arranged on a side, away from the battery, of the wiring harness board;
   a compressing piece, mounted on the wiring harness board;
   a temperature acquisition assembly, comprising a thermistor, wherein the thermistor is electrically connected to the circuit board, and the compressing piece compresses the thermistor, so that the thermistor compresses the top cover;
   an elastic structure arranged on a side, facing towards the top cover, of the wiring harness board and abutting against the top cover, the elastic structure comprising an elastic sheet, wherein:
   one end of the elastic sheet is fixedly connected to the wiring harness board and an other end of the elastic sheet protrudes towards the top cover, or two ends of the elastic sheet are fixedly connected to the wiring harness board, and a middle part of the elastic sheet protrudes towards the top cover, or the middle part of elastic sheet is fixedly connected to the wiring harness board, and the two ends of the elastic sheet protrude towards the top cover, wherein the temperature acquisition assembly further comprises a heat-conducting pad arranged between the thermistor and the top cover, and the heat-conducting pad is compressed to the top cover by the compressing piece, wherein the compressing piece is provided with a mounting groove, and the thermistor is arranged in the mounting groove; and a positioning structure arranged between the compressing piece and the wiring harness board, the positioning structure configured to position the compressing piece, and the positioning structure comprising:

a positioning column, arranged on the wiring harness board; and a positioning hole, formed on the compressing piece, the positioning column passing through the positioning hole and being fixed to the positioning hole.

2. The battery module according to claim 1, wherein the thermistor is electrically connected to the circuit board through a lead.

3. The battery module according to claim 1, wherein the thermistor is fixed to the circuit board to realize electric connection between the thermistor and the circuit board; and the compressing piece compresses the circuit board, and the circuit board compresses the heat-conducting pad to the top cover.

4. The battery module according to claim 1, wherein a depth of the mounting groove is greater than a thickness of the thermistor, and the thermistor is positioned in the mounting groove.

5. The battery module according to claim 1, wherein the mounting groove penetrates through the compressing piece along a thickness direction of the compressing piece.

6. The battery module according to claim 1, wherein the thermistor adheres to an inner wall of the mounting groove through a binder.

7. The battery module according to claim 1, wherein the wiring harness board is provided with a hole, and the heat-conducting pad is mounted in the hole.

8. The battery module according to claim 1, wherein:

the wiring hardness board comprises an abutting portion, the abutting portion being provided with a protrusion;

the battery comprises an electrode terminal arranged on the top cover; and the battery module further comprises a connecting sheet, the connecting sheet being fixedly connected to the electrode terminal and abutting against the protrusion.

9. A device, comprising the battery module according to claim 1, wherein the battery module is configured to provide electric energy.

* * * * *